United States Patent
Kawaguchi (10) Patent No.: US 11,995,189 B2
(45) Date of Patent: May 28, 2024

(54) IMAGE FORMING APPARATUS, FIRMWARE MANIPULATION PREVENTION METHOD, AND COMPUTER-READABLE NON-TRANSITORY RECORDING MEDIUM CONTAINING MANIPULATION PREVENTION PROGRAM

(71) Applicant: KYOCERA Document Solutions Inc., Osaka (JP)

(72) Inventor: Tomoya Kawaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 277 days.

(21) Appl. No.: 17/621,221

(22) PCT Filed: Jun. 23, 2020

(86) PCT No.: PCT/JP2020/024524
§ 371 (c)(1),
(2) Date: Dec. 20, 2021

(87) PCT Pub. No.: WO2020/262347
PCT Pub. Date: Dec. 30, 2020

(65) Prior Publication Data
US 2022/0129558 A1 Apr. 28, 2022

(30) Foreign Application Priority Data

Jun. 27, 2019 (JP) .................................. 2019-119517

(51) Int. Cl.
G06F 21/57 (2013.01)
G06F 21/55 (2013.01)
(Continued)

(52) U.S. Cl.
CPC ............ *G06F 21/572* (2013.01); *G06F 21/55* (2013.01); *G06F 21/62* (2013.01); *H04L 9/3247* (2013.01)

(58) Field of Classification Search
CPC ........ G06F 21/572; G06F 21/55; G06F 21/62; G06F 21/64; H04L 9/3247; H04L 9/3236;
(Continued)

(56) References Cited

U.S. PATENT DOCUMENTS

| | | | | |
|---|---|---|---|---|
| 5,444,850 A | * | 8/1995 | Chang | G06F 21/575 709/228 |
| 6,266,754 B1 | * | 7/2001 | Laczko, Sr. | G06F 21/64 714/E11.21 |

(Continued)

FOREIGN PATENT DOCUMENTS

| | | | |
|---|---|---|---|
| CN | 108632040 A | 10/2018 | |
| EP | 2442251 A2 * | 4/2012 | G06F 21/10 |

(Continued)

OTHER PUBLICATIONS

The first office action in CN mailed by CNIPA (China National Intellectual Property Administration) on May 27, 2023 in the corresponding Chinese Patent Application No. 202080044966.9.

*Primary Examiner* — John B King
(74) *Attorney, Agent, or Firm* — IP Business Solutions, LLC (57) ABSTRACT

An image forming apparatus connectable to a network includes a non-volatile auxiliary storage device containing firmware that causes the image forming apparatus to operate, a manipulation detection device that decides whether the firmware stored in the auxiliary storage device has been manipulated, using the digital signature, a firmware restoration device that deletes the firmware decided to have been manipulated, and installs the firmware provided by another image forming apparatus, a firmware provision device, and (Continued)

a control device. The auxiliary storage device contains firmware that realizes the manipulation detection device, the firmware restoration device, the firmware provision device, and the control device in a boot block writing in which is restricted.

8 Claims, 8 Drawing Sheets

(51) Int. Cl.
*G06F 21/62* (2013.01)
*H04L 9/32* (2006.01)

(58) Field of Classification Search
CPC ........... H04N 1/00938; H04N 1/00015; H04N 1/00031; H04N 1/00084; H04N 1/00244; H04N 1/00344; H04N 1/00973; H04N 1/04; B41J 29/393; B41J 29/38
See application file for complete search history.

(56) References Cited

U.S. PATENT DOCUMENTS

| | | | | |
|---|---|---|---|---|
| 6,711,684 | B1* | 3/2004 | Moroney | G06F 8/66 |
| | | | | 713/194 |
| 6,976,163 | B1* | 12/2005 | Hind | G06F 21/335 |
| | | | | 713/1 |
| 7,069,452 | B1* | 6/2006 | Hind | G06F 21/572 |
| | | | | 713/1 |
| 7,529,834 | B1 | 5/2009 | Birrell et al. | |
| 9,395,968 | B1* | 7/2016 | Nallagatla | G06F 8/71 |
| 2002/0022990 | A1* | 2/2002 | Kurata | B41J 2/17503 |
| | | | | 705/14.36 |
| 2003/0065935 | A1* | 4/2003 | Neufeld | G06F 21/572 |
| | | | | 714/E11.135 |
| 2003/0135705 | A1* | 7/2003 | Montero | H01M 10/4257 |
| | | | | 711/163 |
| 2005/0027987 | A1* | 2/2005 | Neufeld | H04L 9/3236 |
| | | | | 713/176 |
| 2005/0141025 | A1* | 6/2005 | Hanada | H04N 1/00973 |
| | | | | 358/1.15 |
| 2007/0033419 | A1* | 2/2007 | Kocher | G06F 21/10 |
| | | | | 713/193 |
| 2007/0080776 | A1* | 4/2007 | Suwabe | G06F 3/123 |
| | | | | 340/5.2 |
| 2009/0204818 | A1* | 8/2009 | Shin | H04L 9/3236 |
| | | | | 713/176 |
| 2009/0307499 | A1 | 12/2009 | Senda | |
| 2009/0323100 | A1* | 12/2009 | Lee | H04N 1/3201 |
| | | | | 358/1.15 |
| 2010/0083241 | A1* | 4/2010 | Kobayashi | G06F 21/572 |
| | | | | 717/168 |
| 2010/0218178 | A1* | 8/2010 | Sakai | H04N 1/00973 |
| | | | | 717/173 |
| 2012/0206760 | A1* | 8/2012 | Asahara | G06F 3/1285 |
| | | | | 358/1.15 |
| 2015/0058979 | A1* | 2/2015 | Peeters | G06F 21/575 |
| | | | | 726/22 |
| 2017/0046513 | A1* | 2/2017 | McGovern | G06F 8/654 |
| 2018/0123804 | A1* | 5/2018 | Smith | G06F 21/44 |
| 2018/0268164 | A1 | 9/2018 | Minami | |
| 2020/0183677 | A1* | 6/2020 | Hong | G06F 8/66 |

FOREIGN PATENT DOCUMENTS

| | | | | |
|---|---|---|---|---|
| JP | | 2008243183 A | * 10/2008 | ........... G06F 21/572 |
| JP | | 2009-294859 A | 12/2009 | |
| JP | | 2014-026663 A | 2/2014 | |

* cited by examiner

| FIRMWARE | APPARATUS 100 | APPARATUS 200 | APPARATUS 300 |
|---|---|---|---|
| PDL ANALYSIS PROGRAM | ○ | ○ | ○ |
| COLOR CONVERSION PROGRAM | ○ | ○ | ○ |
| HALF TONE PROGRAM | △ | △ | △ |
| IMAGE READING PROGRAM | ○ | ○ | △ |
| BINARIZATION PROGRAM | ○ | ○ | × |
| PDF CONVERSION PROGRAM | ○ | ○ | × |
| COMPRESSION/DECOMPRESSION PROGRAM | ○ | ○ | × |
| MANAGEMENT PROGRAM | ○ | △ | △ |

○ : COMPATIBLE  △ : INCOMPATIBLE  × : N/A

NOTE:
APPARATUS 100 : IMAGE FORMING APPARATUS 100
APPARATUS 200 : IMAGE FORMING APPARATUS 200
APPARATUS 300 : IMAGE FORMING APPARATUS 300

Fig.7

IMAGE FORMING APPARATUS, FIRMWARE MANIPULATION PREVENTION METHOD, AND COMPUTER-READABLE NON-TRANSITORY RECORDING MEDIUM CONTAINING MANIPULATION PREVENTION PROGRAM

TECHNICAL FIELD

The present invention relates to an image forming apparatus, a firmware manipulation prevention method, and a computer-readable non-transitory recording medium containing a manipulation prevention program, and proposes a technique to improve security of an image forming program (firmware) for controlling the image forming apparatus.

BACKGROUND ART

A typical image forming apparatus is configured to execute various operations, such as image forming on a printing medium, FAX transmission, and transmission of scanned data. Such functions are, in general, realized by firmware installed in a hard disk, an example of a non-volatile storage device, provided in the image forming apparatus. Accordingly, in view of the possibility that the firmware may be manipulated, it is desirable to detect the manipulation of the firmware, for example using a hash value. As specific examples, Patent Literature (PTL) 1 and 2 propose a technique including saving version information of the firmware installed at the time of shipment of the image forming apparatus in a management server, making an inquiry to the management server at the time of installation of the image forming apparatus, for comparison of the version information by the management server, to thereby detect whether an unintended manipulation has been made during the period between the shipment and the installation of the image forming apparatus.

CITATION LIST

Patent Literature

PTL 1: Japanese Unexamined Patent Application Publication No. 2009-294859
PTL 2: Japanese Unexamined Patent Application Publication No. 2014-26663

SUMMARY OF INVENTION

Technical Problem

However, although the manipulation that may be made during the period between the shipment and the installation of the image forming apparatus has been taken into account, an attack from outside after the installation has not been sufficiently discussed.

The present invention has been accomplished in view of the foregoing situation, and provides an image forming system including a plurality of image forming apparatuses connected via a network, in which the security of each of the image forming apparatus can be improved with a simple procedure.

Solution to Problem

In an aspect, the present invention provides an image forming apparatus connectable to a network. The image forming apparatus includes a non-volatile auxiliary storage device containing firmware that causes the image forming apparatus to operate, a manipulation detection device that analyzes the firmware stored in the auxiliary storage device and accompanied with a digital signature, and decides, using the digital signature, whether the firmware has been manipulated, a firmware restoration device that deletes the firmware decided to have been manipulated, requests another image forming apparatus connected to the network to provide firmware compatible with the deleted firmware, and installs the firmware provided by the other image forming apparatus, a firmware provision device that provides, upon receipt of a request for firmware compatible with the firmware of the other image forming apparatus, the compatible firmware to the other image forming apparatus, and a control device that controls the manipulation detection device, the firmware restoration device, and the firmware provision device. The auxiliary storage device includes a boot block writing in which is restricted, and contains firmware that realizes the manipulation detection device, the firmware restoration device, the firmware provision device, and the control device, in the boot block.

In another aspect, the present invention provides a manipulation prevention method for firmware installed in an image forming apparatus connectable to a network. The method includes a storing process including storing the firmware that enables the image forming apparatus to operate, in a non-volatile auxiliary storage device, a manipulation detection process including analyzing the firmware stored in the auxiliary storage device and accompanied with a digital signature, and deciding, using the digital signature, whether the firmware has been manipulated, a firmware restoration process including deleting the firmware decided to have been manipulated, requesting another image forming apparatus connected to the network to provide firmware compatible with the deleted firmware, and installing the firmware provided by the other image forming apparatus, a firmware provision process including providing, upon receipt of a request for firmware compatible with the firmware of the other image forming apparatus, the compatible firmware to the other image forming apparatus, and a controlling process including controlling the manipulation detection process, the firmware restoration process, and the firmware provision process. The storing process includes storing the firmware that causes the image forming apparatus to execute the manipulation detection process, the firmware restoration process, the firmware provision process, and the controlling process, in a boot block writing in which is restricted, included in the auxiliary storage device.

In still another aspect, the present invention provides a computer-readable non-transitory recording medium containing a manipulation prevention program for preventing manipulation of firmware installed in an image forming apparatus connectable to a network. The recording medium is configured to cause a computer of the image forming apparatus to act, when a processor of the computer of the image forming apparatus executes the manipulation prevention program, as a manipulation detection device that analyzes the firmware that causes the image forming apparatus to operate, stored in a non-volatile auxiliary storage device in the image forming apparatus and accompanied with a digital signature, and decides, using the digital signature, whether the firmware has been manipulated, a firmware restoration device that deletes the firmware decided to have been manipulated, requests another image forming apparatus connected to the network to provide firmware compatible with the deleted firmware and installs the firmware provided by the other image forming apparatus, a firmware provision device that provides, upon receipt of a request for firmware compatible with the firmware of the other image forming apparatus, the compatible firmware to the other image forming apparatus, and a control device that controls the manipulation detection device, the firmware restoration device, and the firmware provision device. The recording medium is further configured to cause the computer to store the firmware that realizes the manipulation detection device, the firmware restoration device, the firmware provision device, and the control device, in a boot block writing in which is restricted, included in the auxiliary storage device.

Advantageous Effects of Invention

With the foregoing arrangement according to the present invention, the security of each of the plurality of image forming apparatus, connected via the network and included in the image forming system, can be improved with a simple procedure.

DESCRIPTION OF EMBODIMENT

Hereafter, some forms to carry out the present invention (hereinafter, "embodiment") will be described, with reference to the drawings.

Figure 1:
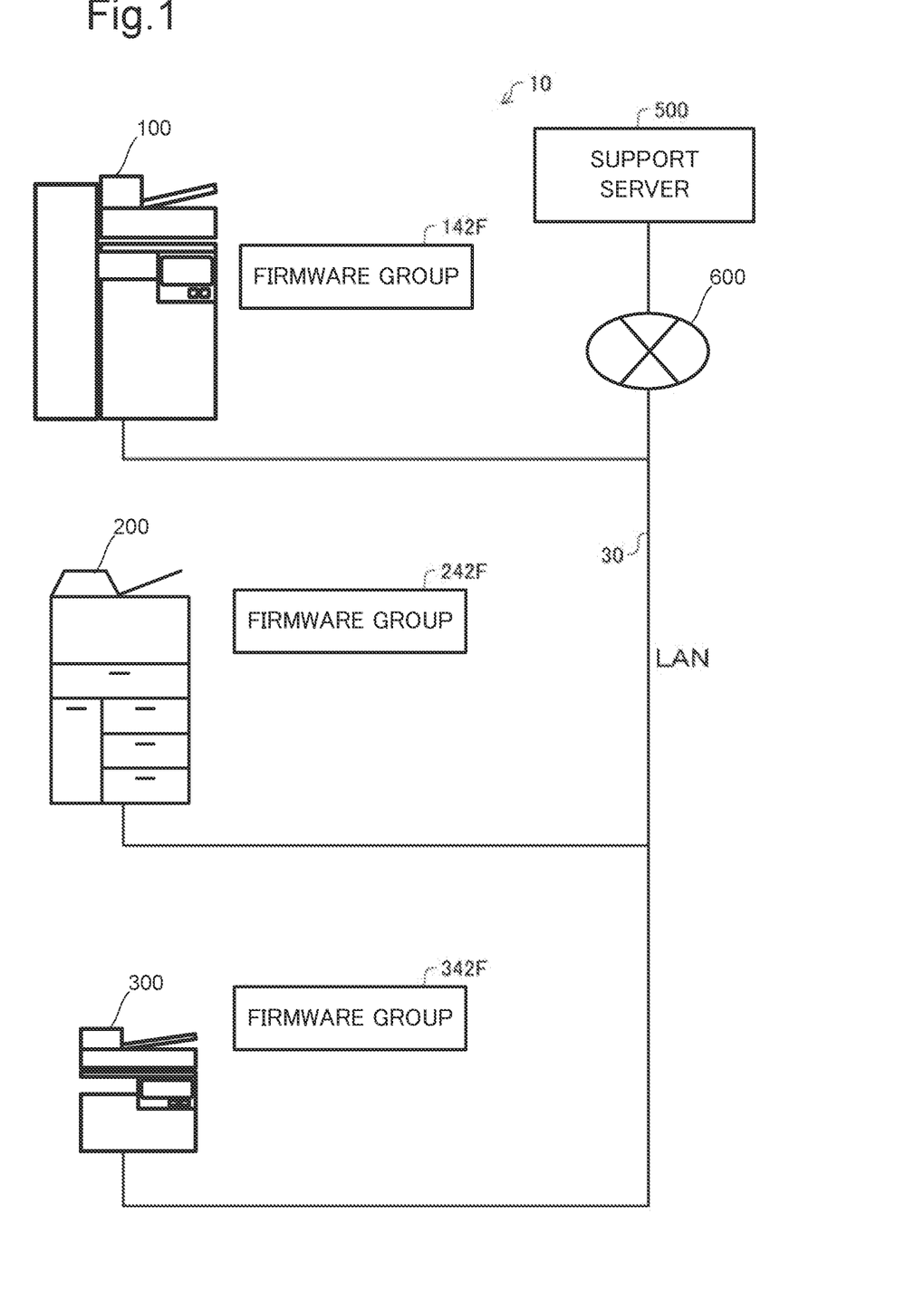
FIG. 1 is a schematic diagram showing a general configuration of an image forming system, including an image forming apparatus according to an embodiment of the present invention.

FIG. 1 is a schematic diagram showing a general configuration of an image forming system, including an image forming apparatus according to the embodiment of the present invention. The image forming system 10 includes, in this embodiment, a plurality (e.g., three) of image forming apparatuses 100, 200, and 300 connected to one another via a local area network (hereinafter, LAN) 30. As shown in FIG. 1, in the image forming system 10 the plurality of image forming apparatuses 100, 200, and 300 are connected (connectable) to one another via the LAN 30, and a support server 500 and a personal computer (not shown) are connectable to the system.

Figure 3A:
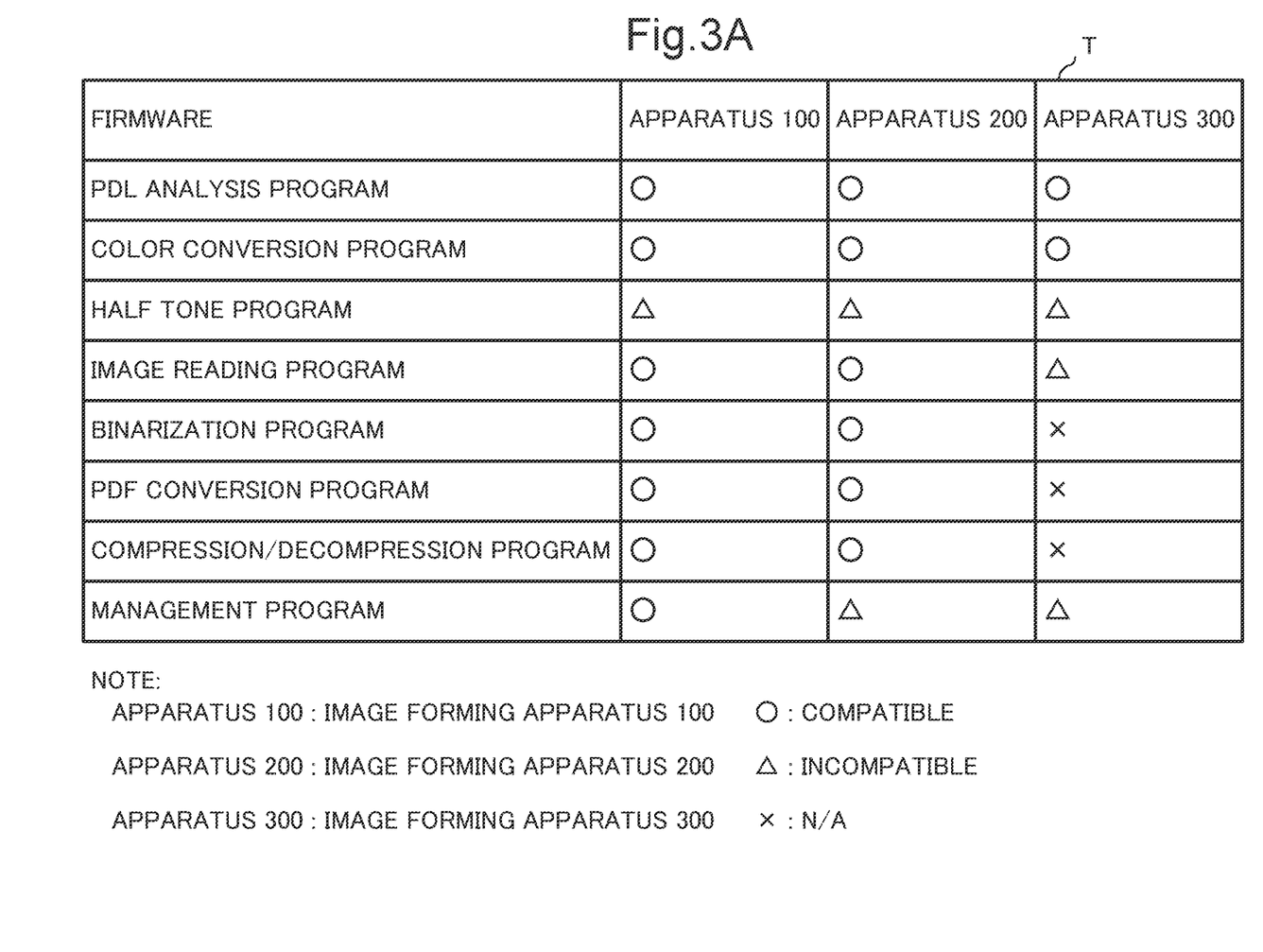
FIG. 3A is a firmware management table for showing details of firmware of three image forming apparatuses according to the embodiment.

In this embodiment, the three image forming apparatuses 100, 200, and 300 are different in configuration from each other, though they may have the same configuration. To be more detailed, a firmware group 142F, a firmware group 242F, and a firmware group 342F are respectively installed in the three image forming apparatuses 100, 200, and 300. As shown in FIG. 3A to be subsequently referred to, the firmware group 142F and the firmware group 242F include a PDL analysis program, a color conversion program, a half tone program, an image reading program, a binarization program, a PDF conversion program, a compression/decompression program, and a management program. In contrast, although the firmware group 342F includes the PDL analysis program, the color conversion program, the half tone program, the image reading program, and the management program, the firmware group 342F is without the binarization program, the PDF conversion program, and the compression/decompression program. The firmware group 142F, the firmware group 242F, and the firmware group 342F are different in composition from one another. Accordingly, the image forming apparatuses 100, 200, and 300 have different functions from one another such that, for example, one apparatus has a transmission function, while another apparatus is without the transmission function. The details of each program will be subsequently described. In the present description, the firmware and the program are used as synonyms.

The support server 500 is connected to the LAN 30, via the internet 600. The support server 500 is provided by the manufacturer of the three image forming apparatuses 100, 200, and 300. The support server 500 also acts as a public key certificate authority (CA), and is authorized to issue a public key certificate to the user. The public key certificate serves to associate the public key and the identification information of the owner of the certificate (i.e., image forming apparatus).

Figure 2:
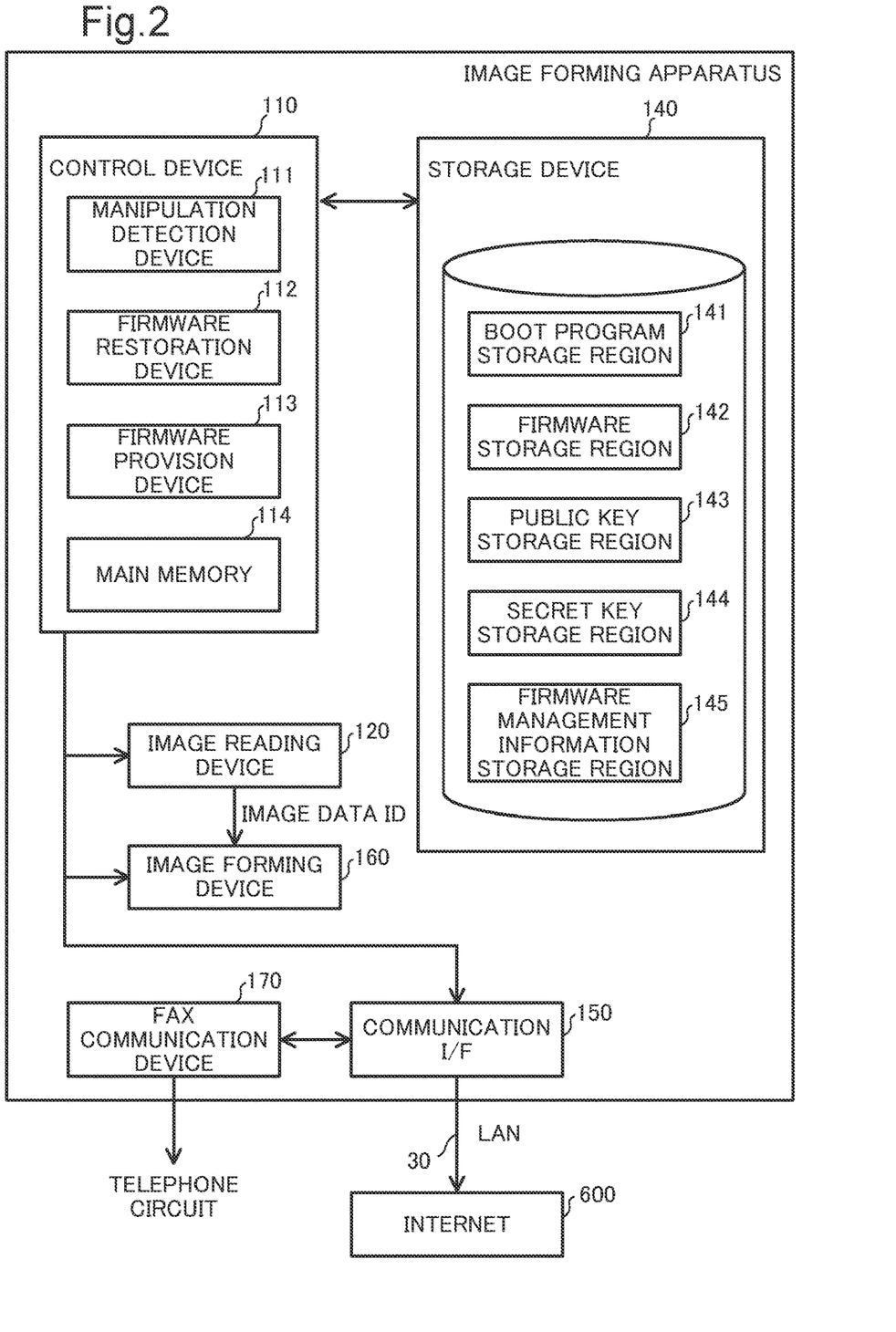
FIG. 2 is a schematic block diagram showing a configuration of the image forming apparatus according to the embodiment.

FIG. 2 is a schematic block diagram showing a configuration of the image forming apparatus 100 according to the embodiment of the present invention. The image forming apparatus 100 includes a control device 110, an image reading device 120, a storage device 140, a communication interface (I/F) 150, an image forming device 160, and a FAX communication device 170. The image reading device 120 reads the image of a source document, and generates image data ID which is digital data. The image forming device 160 forms the image on a printing medium (not shown), according to the image data ID or a printing job received from a personal computer 20, and delivers the printing medium. The printing medium is also called an image forming medium. The FAX communication device 170 transmits and receives a facsimile. To transmit the facsimile, a binarization process is executed.

The control device 110 includes a central processing unit (CPU), a random-access memory (RAM) constituting a main memory 114, a read-only memory (ROM), and an exclusive hardware circuit. The control device 110 also has a function to control interfaces, such as various types of I/O, a universal serial bus (USB), a bus, and other hardware. The control device 110 controls the overall operation of the image forming apparatus 100. In this embodiment, it will be assumed that the control device 110 employs Linux (registered trademark) kernel as the operating system.

The control device 110 acts as a manipulation detection device 111, a firmware restoration device 112, and a firmware provision device 113, when the CPU executes a control program stored in the storage device 140 (including a manipulation detection program, a firmware restoration program, and a firmware provision program to be subsequently described). The CPU executes the processings, using predetermined storage regions in the main memory 114.

The storage device 140 is a memory unit such as a hard disk drive, for storing the firmware that causes the image forming apparatus 100 to operate. For example, the storage device 140 may be a hard disk drive which is a non-transitory and non-volatile recording medium, having a hard disk encryption function. The storage device 140 includes a boot program storage region 141, a firmware storage region 142, a public key storage region 143, a secret key storage region 144, and a firmware management information storage region 145. The firmware storage region 142, the public key storage region 143, the secret key storage region 144, and the firmware management information storage region 145 are rewritable. In contrast, the boot program storage region 141 is not rewritable, in other words, writing in the boot program storage region 141 is restricted.

The boot program storage region 141 is a boot block storing a boot program, the manipulation detection program, the firmware restoration program, and the firmware provision program. The manipulation detection device 111, the firmware restoration device 112, and the firmware provision device 113 are realized, when the CPU executes the manipulation detection program, the firmware restoration program, and the firmware provision program, respectively. The firmware storage region 142 contains the firmware group 142F.

The public key storage region 143 is for storing public keys. The public keys include a public key for manipulation detection PKf of the firmware supplier, and a public key for external communication PKc used by the image forming apparatus 100 when making communication with outside. The public key for manipulation detection PKf is used by the manipulation detection device 111 to detect manipulation. The public key for external communication PKc is registered in advance in the support server 500 and other image forming apparatuses 200 and 300 in the network (from the viewpoint of image forming apparatus 100). The secret key storage region 144 is for storing secret keys. The secret keys include a secret key for communication SKc used by the image forming apparatus 100 when making communication with outside.

The manipulation detection device 111 is stored in the storage device 140, and serves to analyze the firmware accompanied with a digital signature, to thereby decide whether the firmware has been manipulated, using the digital signature.

The firmware restoration device 112 deletes the firmware decided to have been manipulated, and requests another image forming apparatus connected to the LAN 30 (network) (e.g., image forming apparatus 200) to provide firmware compatible with the deleted one. Then the firmware restoration device 112 installs the firmware provided by the other image forming apparatus (e.g., image forming apparatus 200).

The firmware provision device 113 provides, upon receipt of a request to provide firmware compatible with the firmware of the other image forming apparatus (e.g., image forming apparatus 200) the compatible firmware to the other image forming apparatus (e.g., image forming apparatus 200).

FIG. 3A is a firmware management table for showing details of the firmware of the three image forming apparatuses 100, 200, and 300 according to the embodiment. The firmware management information storage region 145 of each of the three image forming apparatuses 100, 200, and 300 contains the firmware management table T shown in FIG. 3A. The firmware management table T indicates whether the firmware is installed, and compatibility with other firmware. Circular symbols indicate that the program is compatible. Triangular symbols indicate that the program is incompatible. Cross marks indicate that the program is not installed.

To be more detailed, the PDL analysis program is installed in all of the three image forming apparatuses 100, 200, and 300, and is compatible with one another. The half tone program is installed in all of the three image forming apparatuses 100, 200, and 300, but incompatible with one another. The image reading program is installed in all of the three image forming apparatuses 100, 200, and 300, but compatible only between two image forming apparatuses 100 and 200. The PDF conversion program is installed only in two image forming apparatuses 100 and 200, and compatible with each other.

Figure 3B:
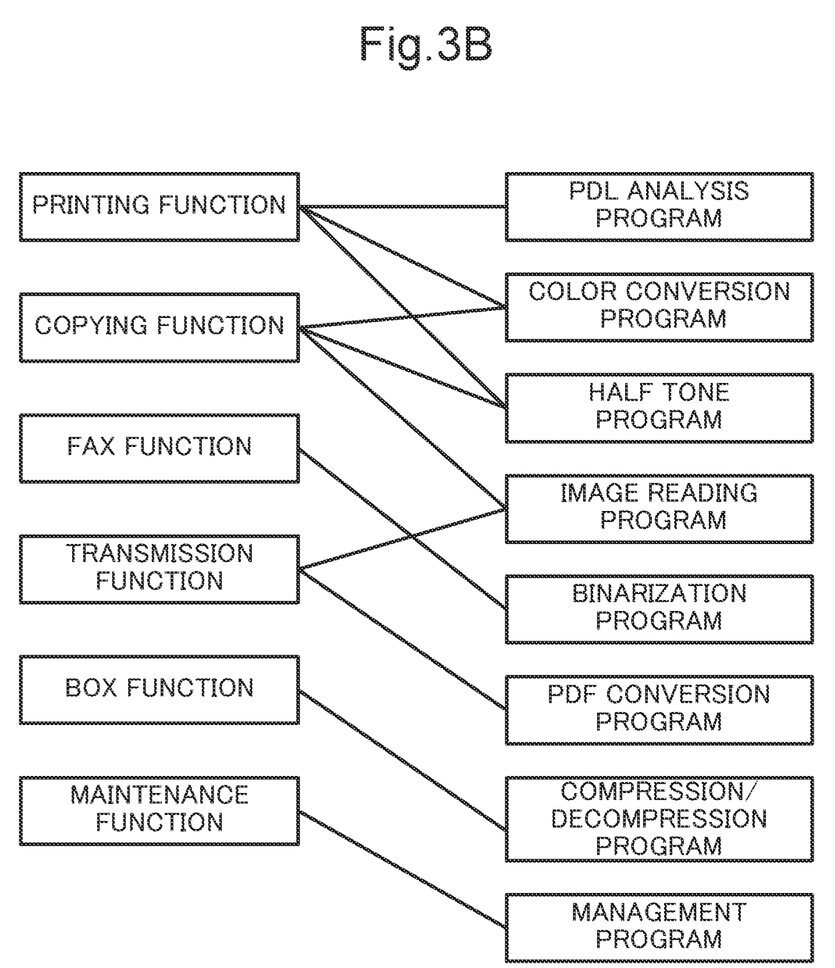
FIG. 3B is a schematic diagram for explaining the firmware to be used for functions of the three image forming apparatuses according to the embodiment.

FIG. 3B is a schematic diagram for explaining the firmware to be used for the functions of the three image forming apparatuses according to the embodiment. FIG. 3B indicates the firmware used for each of the functions of the three image forming apparatuses 100, 200, and 300. For example, the printing function utilizes the PDL analysis program, the color conversion program, and the half tone program. The transmission function utilizes the image reading program and the PDF conversion program. Such information is stored in the firmware management information storage region 145.

The firmware is accompanied with the digital signature. The digital signature is generated by encrypting the hash value of the firmware translated into a machine language, with the secret key. From the digital signature, the has value can be acquired by decrypting with the public key (also called public key for manipulation detection) constituting a pair with the secret key. The manipulation detection device 111 again calculates the hash value of the firmware translated into the machine language, to thereby decide whether the firmware translated into the machine language has been manipulated, or confirm that the firmware has not been manipulated, through comparison between the calculated hash value and the hash value acquired by the decryption.

In this embodiment, the firmware supplier can generate the digital signature using the supplier's own secret key, and generate the firmware accompanied with the digital signature, by adding the digital signature to the firmware. In principle, the firmware supplier supplies the firmware accompanied with the digital signature to the user of the image forming apparatuses 100, 200, and 300, with the public key for manipulation detection, constituting a pair with the secret key used for the encryption of the digital signature.

Here, in the case where the firmware supplier provides the firmware without the digital signature, instead of the firmware accompanied with the digital signature, the image forming apparatuses 100, 200, and 300 can each generate the secret key (or use the originally owned secret key) to generate the digital signature, with the manipulation detection device (e.g., manipulation detection device 111 in the case of image forming apparatus 100), thereby obtaining the firmware accompanied with the digital signature.

The firmware management information storage region 145 contains information for identifying the public key for manipulation detection constituting a pair with the secret key used to generate the digital signature for the firmware, in association with the corresponding firmware. The firmware management information storage region 145 also contains ID information for identifying each of the image forming apparatuses 100, 200, and 300.

The mentioned configuration of the image forming apparatus 100 is based on FIG. 2. The image forming apparatuses 200 and 300 each include at least the elements corresponding to the control device 110, the image reading device 120, the storage device 140, the image forming apparatus 160, and the communication interface 150 of the image forming apparatus 100. Therefore, detailed description on the configuration of the image forming apparatuses 200 and 300 will be skipped.

Figure 4:
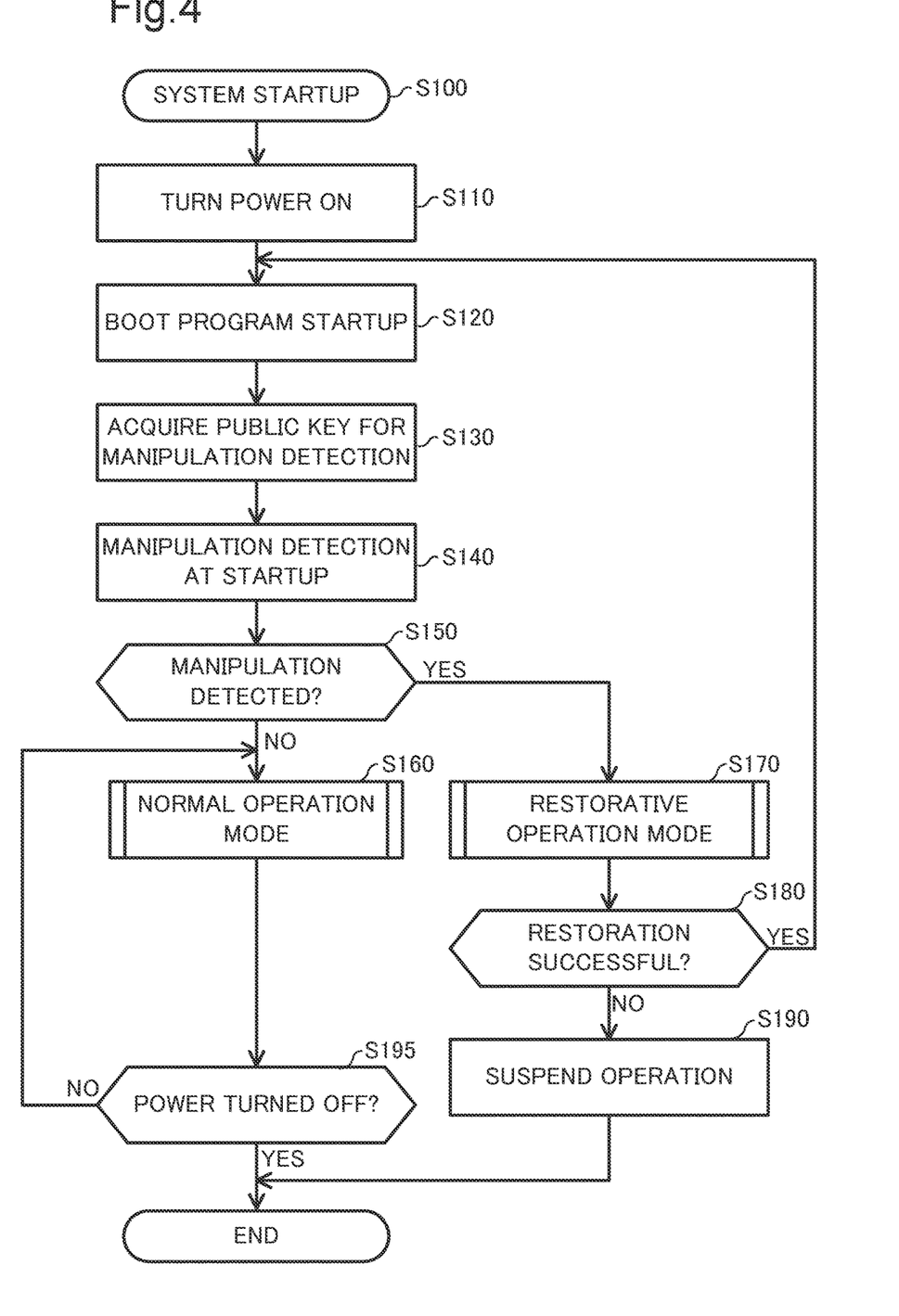
FIG. 4 is a flowchart showing details of a system startup process according to the embodiment.

FIG. 4 is a flowchart showing details of a system startup process (step S100) according to the embodiment. At step S110, the user turns on the power to the image forming apparatus 100. The power may be automatically turned on by a timer, at a predetermined time.

At step S120, the image forming apparatus 100 starts up the boot program. In the boot program startup process, the CPU (not shown) of the image forming apparatus 100 retrieves the boot program from the boot block on the hard disk of the storage device 140, and starts up the image forming apparatus 100. In this embodiment, the boot program includes, in addition to a startup program and setting information, programs for realizing the manipulation detection device 111, the firmware restoration device 112, and the firmware provision device 113 of the control device 110. The storage device 140 is also called as auxiliary storage device.

At step S130, the manipulation detection device 111 acquires the public key for manipulation detection. More specifically, the manipulation detection device 111 attempts to acquire the public key for manipulation detection PKf for the corresponding firmware, from the public key storage region 143 in the storage device 140. Upon completing the acquisition of the public key for manipulation detection PKf for the corresponding firmware, the manipulation detection device 111 proceeds to step S140.

Upon deciding that there is firmware without the public key for manipulation detection PKf, the manipulation detection device 111 generates the pair of the secret key and the public key, for such firmware. The manipulation detection device 111 generates the digital signature using the secret key, and stores the information for identifying the public key for manipulation detection constituting the pair with the secret key used to generate the digital signature, in the firmware management information storage region 145 in association with the firmware. The mentioned operation is performed after the firmware without the digital signature is installed, in other words at the time of first startup after the installation.

At step S140, the manipulation detection device 111 executes a manipulation detection at startup process. In the manipulation detection at startup according to this embodiment, the manipulation detection device 111 utilizes the digital signatures stored in the hard disk of the storage device 140 in association with the corresponding firmware, to confirm that the firmware has not been manipulated.

At step S150, the manipulation detection device 111 proceeds to step S160 in the case where the manipulation has not been detected, or proceeds to step S170 when the manipulation has been detected in at least one of the firmware. A normal operation mode is continued until the power to the image forming apparatus 100 is turned off (step S195).

In the case where no manipulation has been detected, the manipulation detection device 111 erases (deletes) the secret key generated in the image forming apparatus 100 and constituting the pair with the public key for manipulation detection. Therefore, the image forming apparatus 100 can prevent malicious use of the secret key generated therein, thereby improving the security level.

Figure 5:
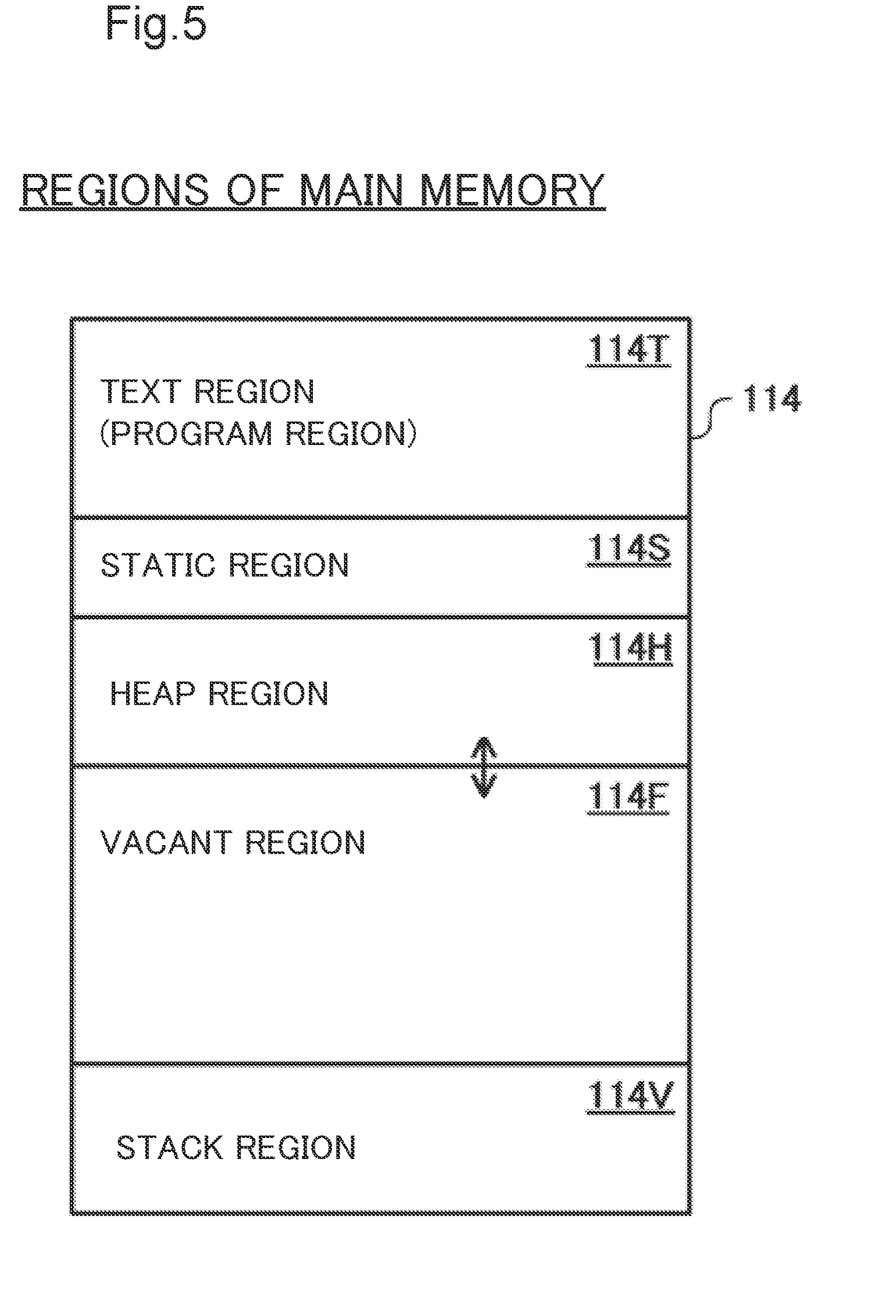
FIG. 5 is a schematic diagram for explaining status of regions in a main memory, after the startup of the image forming apparatus according to the embodiment.

FIG. 5 is a schematic diagram for explaining the status of the regions in the main memory 114, after the startup of the image forming apparatus according to the embodiment. The main memory 114 is composed of a text region 114T, a static region 114S, a heap region 114H, a vacant region 114F, and a stack region 114V. The main memory 114 is also called as main storage device.

The text region 114T, also called as program region, is a region of a fixed size in which programs translated into a machine language are stored. The image forming apparatus 100 retrieves, at the time of startup, the program translated into the machine language from the boot program storage region 141, and stores that program in the text region 114T. The processings are performed when the commands in the machine language are executed by the CPU.

The static region 114S is a region of a fixed size, in which static variables such as a global variable is stored. The static variable refers to a variable that does not change during the execution of the processings. The stack region 114V is a region of a fixed size, in which automatic variables (local variables) and temporary variables such as an argument and return value of a function are stored. In the stack region 114V, the register of the CPU can be temporarily saved.

The heap region 114H is a dynamic region where, in the case of the C programming language for example, the process can secure physical memory with a malloc function, and free the physical memory with a free function. In each process, a storage region required for the process is secured as a physical memory with the malloc function, and the physical memory is freed after the completion of the process. The vacant region 114F refers to a region other than the region secured in the heap region 114H. Therefore, the heap region 114H and the vacant region 114F vary depending on the operation performed in each process.

Figure 6:
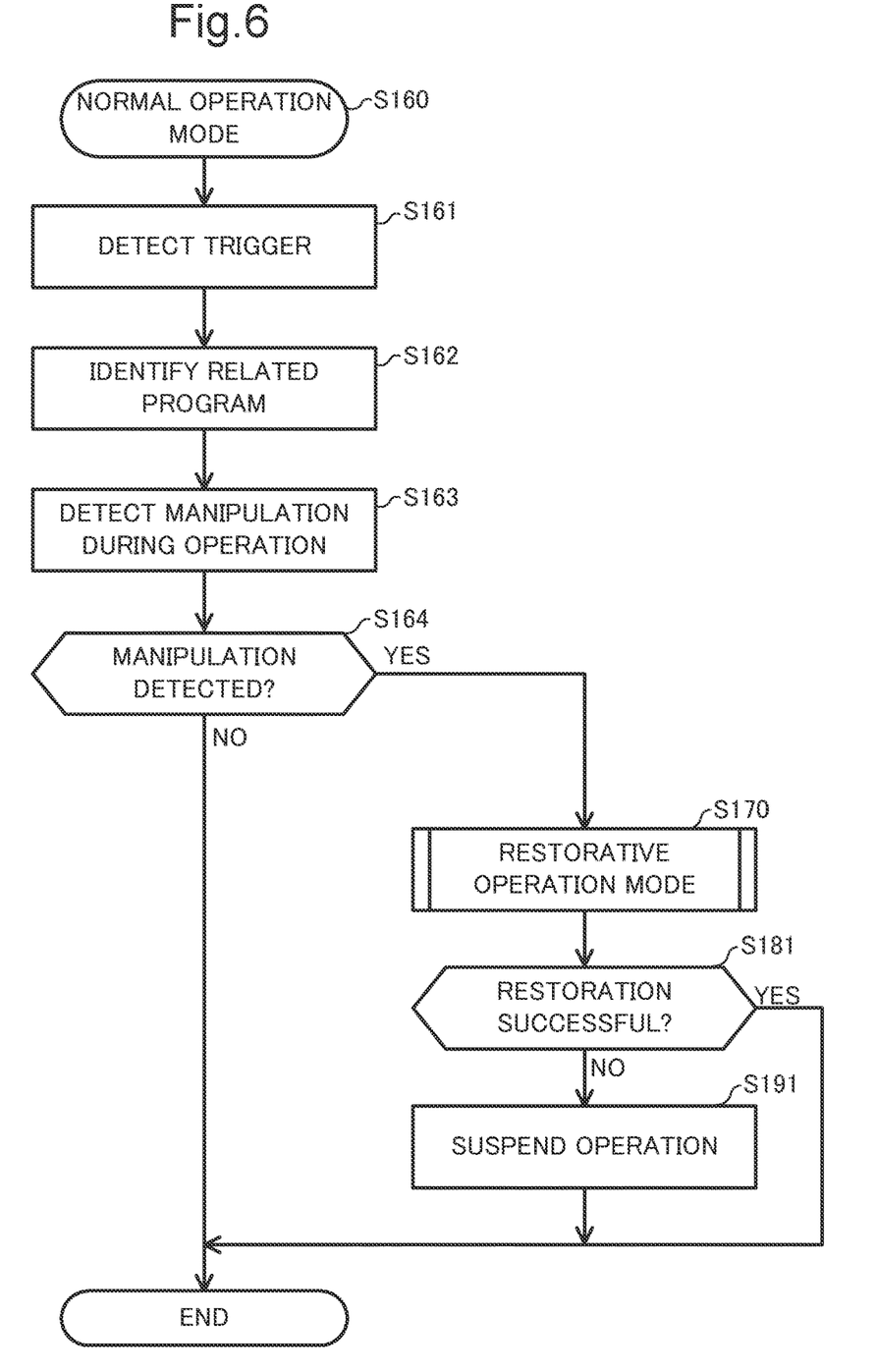
FIG. 6 is a flowchart showing details of a normal operation mode performed by the image forming apparatus according to the embodiment.

FIG. 6 is a flowchart showing details of the normal operation mode (step S160) performed by the image forming apparatus according to the embodiment. In the normal operation mode, the manipulation is detected on the background of the operation of the image forming apparatus, such as printing and copying.

At step S161, the manipulation detection device 111 executes a trigger detection process. In the trigger detection process, the manipulation detection device 111 detects such events as receipt of a printing job, movement of the document table cover, and lapse of a predetermined time set by a timer, as the trigger.

At step S162, the manipulation detection device 111 executes a related program identification process. In the related program identification process, the manipulation detection device 111 predicts the function to be used, according to the type of the trigger, and identifies the firmware from which manipulation is to be detected. For example, when the trigger is the receipt of the printing job, the manipulation detection device 111 identifies the PDL analysis program, the color conversion program, and the half tone program, which are used for the printing job, as the object of the manipulation detection.

Therefore, the manipulation detection device 111 can decide, before (immediately before) the execution of the firmware, whether the firmware to be executed to realize the predicted function has been manipulated, thus completing the manipulation detection. Here, when the trigger is the lapse of the time set by the timer, the manipulation detection device 111 identifies all of the firmware as the object of the manipulation detection.

At step S163, the manipulation detection device 111 executes the manipulation detection during the operation. To detect the manipulation during the operation, the manipulation detection device 111 utilizes the digital signature accompanying the firmware stored in the text region 114T of the main memory 114, to check whether the firmware in the main memory 114 has been manipulated.

Figure 7:
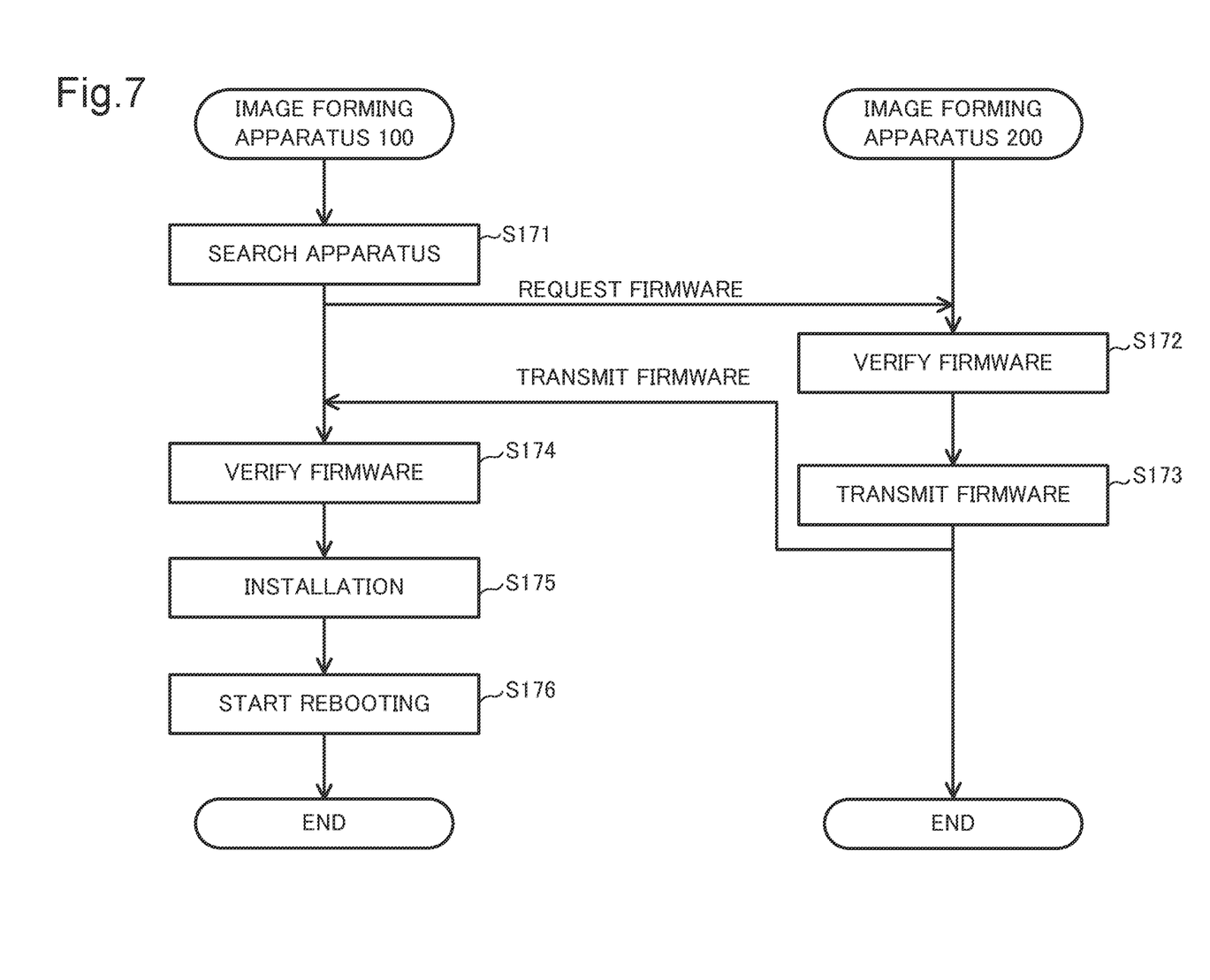
FIG. 7 is a flowchart showing details of a restorative operation mode performed by the image forming apparatus according to the embodiment.

At step S164, the manipulation detection device 111 finishes the operation in the case where the manipulation has not been detected, but proceeds to a restorative operation mode (step S170), when the manipulation has been detected at least in one of the firmware. The operation to be performed in the restorative operation mode (step S170) is the same as that in the restorative operation mode (step S170) in the system startup process (step S100). In this example, it will be assumed that the manipulation has been detected in the PDL analysis program.

FIG. 7 is a flowchart showing details of a restorative operation mode performed by the image forming apparatus according to the embodiment. In the restorative operation mode, the firmware restoration device 112 deletes the firmware in which the manipulation detection device 111 has detected the manipulation, and replaces the firmware compatible with the deleted firmware, provided from another image forming apparatus 200 or 300 in the network.

At step S171, the firmware restoration device 112 of the image forming apparatus 100 searches the two image forming apparatuses 200 and 300 which are capable of providing the compatible PDL analysis program, by looking up the firmware management table T, and selects one of these image forming apparatuses. For example, the firmware restoration device 112 selects, out of the two image forming apparatuses 200 and 300, the one having a larger number of compatible programs according to FIG. 3A (the image forming apparatus 200 contains a larger number of compatible programs than the image forming apparatus 300), as the image forming apparatus to which the request for the firmware is to be made. Thus, the firmware restoration device 112 selects the image forming apparatus 200 as the provider of the firmware. Here, the firmware restoration device 112 may select the image forming apparatus 200 according to a predetermined selection priority (e.g., image forming apparatus 200 is at the first place in selection priority, and image forming apparatus 300 is at the second place). Alternatively, the firmware restoration device 112 may select the image forming apparatus 200, according to the selection instruction from a manager operating the image forming apparatus 100.

The firmware restoration device 112 of the image forming apparatus 100 can acquire the ID information for identifying the image forming apparatus 100 from the firmware management information storage region 145, and generate a firmware request ticket accompanied with the digital signature, using the ID information and firmware identification information for identifying the PDL analysis program. The firmware request ticket accompanied with the digital signature may be generated, for example, as a simple object access protocol (SOAP) message. The SOAP message representing the firmware request ticket accompanied with the digital signature is a data file having a SOAP envelope containing the SOAP main body.

The SOAP main body contains the data including the ID information for identifying the image forming apparatus 100, which is the sender of the SOAP message, and the firmware identification information, and the digital signature generated by encrypting the hash value of that data with the secret key for communication SKc. Thus, the firmware restoration device 112 of the image forming apparatus 100 can transmit the firmware request ticket accompanied with the digital signature, to the image forming apparatus 200 via the LAN 30.

At step S172, the firmware provision device of the image forming apparatus 200 receives the SOAP message. The firmware provision device confirms that the SOAP message has not been manipulated, using the digital signature in the SOAP message, and analyzes the content of the SOAP message.

The firmware provision device of the image forming apparatus 200 confirms that the image forming apparatus 100, the sender of the SOAP message, is registered in advance in the firmware management table T in the image forming apparatus 200. Upon confirming that the image forming apparatus 100 is registered, the firmware provision device identifies that the image forming apparatus 100 is requesting to provide the PDL analysis program, and verifies that the PDL analysis program in the image forming apparatus 200 has not been manipulated (firmware verification).

At step S173, the firmware provision device of the image forming apparatus 200 encrypts the verified PDL analysis program, using the public key for external communication PKc acquired in advance from the image forming apparatus 100, thereby generating the SOAP message accompanied with the digital signature. The firmware provision device of the image forming apparatus 200 then transmits the SOAP message containing the PDL analysis program, to the image forming apparatus 100. The SOAP based on the XML format does not depend on a protocol, and therefore the PDL analysis program can be transmitted and received, using the HTTPS protocol.

In this embodiment, it suffices that the legitimacy of the image forming apparatus 100 and the image forming apparatus 200 can be confirmed, for example by using the digital signature, for the communication therebetween, without limitation to the use of the SOAP message. Further, the transmission method of the firmware is not limited to the use of the HTTPS protocol. For example, a Diffie-Hellman key sharing algorithm may be employed, to transmit the firmware on the basis of a shared key system.

At step S174, the manipulation detection device 111 of the image forming apparatus 100 confirms that the received PDL analysis program has not been manipulated, using the digital signature. At step S175, the firmware restoration device 112 installs the received PDL analysis program in the hard disk of the storage device 140. At step S176, the firmware restoration device 112 reboots the image forming apparatus 100, when the installation of the PDL analysis program in the hard disk of the storage device 140 has been completed.

At step S181 (see FIG. 6), the control device 110 continues with the normal operation mode when the restoration is successfully completed, but suspends the operation of the image forming apparatus 100, when the restoration has failed (step S191). Here, when the restorative operation mode (step S170) in the system startup process (step S100) is completed also, the control device 110 proceeds to the boot program startup process (step S120) when the restoration is successful, but suspends the operation of the image forming apparatus 100 when the restoration has failed (step S190), and finishes the operation (step S180).

In the image forming system 10 according to the embodiment, as described above, the three image forming apparatuses 100, 200, and 300 can each continuously detect the manipulation of the firmware, during the period from the startup to the finish of the operation. Therefore, the image forming system 10 can fortify the capacity to resist against an attack to an in-house network including the image forming apparatuses. Further, the three image forming apparatuses 100, 200, and 300 can mutually provide the firmware for automatic restoration, in the image forming system 10. As a result, the downtime of the three image forming apparatuses 100, 200, and 300 can be shortened, and the burden on the maintenance staff can be alleviated.

The present invention is not limited to the foregoing embodiment, but may be implemented according to the following variations.

Variation 1

Although each of the three image forming apparatuses 100, 200, and 300 includes the firmware management information storage region in the foregoing embodiment, it is not mandatory that the image forming apparatus is configured to store the firmware management information. A server connected to the network (e.g., support server 500) may manage the firmware management information.

Variation 2

Although the support server 500 acts as the public key certificate authority in the embodiment, for example the support server 500 may provide the firmware to the image forming system 10, when the firmware is unavailable in the image forming system 10.

Variation 3

Although the boot program storage region 141 is provided on the hard disk in the embodiment, the boot program storage region 141 may be provided in a ROM, such as a masked ROM or a PROM. In this case, the auxiliary storage device includes the hard disk and the ROM.

Further, the configurations and processings described in the foregoing embodiments with reference to FIG. 1 to FIG. 7 are merely exemplary, and in no way intended to limit the present invention to those configurations and processings.

The invention claimed is:

1. An image forming apparatus connectable to a network, the image forming apparatus comprising:
   a non-volatile auxiliary storage device containing firmware that causes the image forming apparatus, which is a first image forming apparatus, to operate;
   a manipulation detection device that analyzes the firmware stored in the auxiliary storage device and accompanied with a digital signature, and decides, using the digital signature, whether the firmware has been manipulated;
   a firmware restoration device that deletes the firmware decided to have been manipulated, requests a second image forming apparatus connected to the network to provide firmware compatible with the deleted firmware, and installs the firmware provided by the second image forming apparatus;
   a firmware provision device that provides, upon receipt of a request, from a third image forming apparatus connected to the network, for compatible firmware compatible with firmware of the third image forming apparatus, the compatible firmware to the third image forming apparatus; and
   a control device that controls the manipulation detection device, the firmware restoration device, and the firmware provision device,
   wherein the auxiliary storage device includes a boot block writing in which is restricted, and contains firmware that realizes the manipulation detection device, the firmware restoration device, the firmware provision device, and the control device, in the boot block.

2. The image forming apparatus according to claim 1, further comprising a main storage device in which the firmware retrieved from the auxiliary storage device is written at startup of the image forming apparatus,
   wherein the image forming apparatus retrieves the firmware for realizing the manipulation detection device, the firmware restoration device, the firmware provision device, and the control device, and writes the firmware in the main storage device, and
   the control device decides whether the firmware retrieved from a storage region of the auxiliary storage device other than the boot block has been manipulated, and writes the firmware in the main storage device, upon deciding that the manipulation has not been made.

3. The image forming apparatus according to claim 2,
   wherein the manipulation detection device decides, during an operation of the image forming apparatus, whether the firmware written in the main storage device using the digital signature, in response to detection of a predetermined trigger, has been manipulated, and
   the firmware restoration device deletes the firmware decided to have been manipulated, from the main storage device, installs firmware provided from the second image forming apparatus in the auxiliary storage device, and reboots the image forming apparatus, when the installation is completed.

4. The image forming apparatus according to claim 3,
   wherein the manipulation detection device predicts a function to be used, out of a plurality of functions of the image forming apparatus, according to a type of the trigger, and decides whether the firmware to be used to realize the predicted function, among the firmware written in the main storage device, has been manipulated, before the firmware is executed.

5. The image forming apparatus according to claim 1,
   wherein, upon deciding that there is firmware without a public key, the manipulation detection device generates a pair of a secret key and the public key, after installing the firmware without the public key, and generates the digital signature by calculating a hash value of the firmware, and deleting the secret key after encrypting the hash value using the secret key.

6. The image forming apparatus according to claim 1,
   wherein the auxiliary storage device contains a firmware management information storage region including a firmware management table indicating the firmware installed in the first image forming apparatus, the second image forming apparatus, and the third image forming apparatus, and compatibility of the firmware, and ID information for identifying the first image forming apparatus, the second image forming apparatus, and the third image forming apparatus, and
   the firmware restoration device searches the second image forming apparatus using the firmware management table stored in the firmware management information storage region of the auxiliary storage device, and requests the second image forming apparatus to provide the compatible firmware, using the ID information of the second image forming apparatus that has been searched.

7. A manipulation prevention method for firmware installed in an image forming apparatus connectable to a network, the method comprising:
- a storing process including storing the firmware that enables the image forming apparatus, which is a first image forming apparatus, to operate, in a non-volatile auxiliary storage device;
- a manipulation detection process including analyzing the firmware stored in the auxiliary storage device and accompanied with a digital signature, and deciding, using the digital signature, whether the firmware has been manipulated;
- a firmware restoration process including deleting the firmware decided to have been manipulated, requesting a second image forming apparatus connected to the network to provide firmware compatible with the deleted firmware, and installing the firmware provided by the second image forming apparatus;
- a firmware provision process including providing, upon receipt of a request, from a third image forming apparatus connected to the network, for compatible firmware compatible with firmware of the third image forming apparatus, the compatible firmware to the third image forming apparatus; and
- a controlling process including controlling the manipulation detection process, the firmware restoration process, and the firmware provision process,
- wherein the storing process includes storing the firmware that causes the image forming apparatus to execute the manipulation detection process, the firmware restoration process, the firmware provision process, and the controlling process, in a boot block writing in which is restricted, included in the auxiliary storage device.

8. A computer-readable non-transitory recording medium containing a manipulation prevention program for preventing manipulation of firmware installed in an image forming apparatus connectable to a network, the recording medium being configured to cause a computer of the image forming apparatus to act, when a processor of the computer of the image forming apparatus executes the manipulation prevention program, as:
- a manipulation detection device that analyzes the firmware that causes the image forming apparatus, which is a first image forming apparatus, to operate, stored in a non-volatile auxiliary storage device in the image forming apparatus and accompanied with a digital signature, and decides, using the digital signature, whether the firmware has been manipulated;
- a firmware restoration device that deletes the firmware decided to have been manipulated, requests a second image forming apparatus connected to the network to provide firmware compatible with the deleted firmware and installs the firmware provided by the second image forming apparatus;
- a firmware provision device that provides, upon receipt of a request, from a third image forming apparatus connected to the network, for compatible firmware compatible with firmware of the third image forming apparatus, the compatible firmware to the third image forming apparatus; and
- a control device that controls the manipulation detection device, the firmware restoration device, and the firmware provision device,
- the recording medium being further configured to cause the computer to store the firmware that realizes the manipulation detection device, the firmware restoration device, the firmware provision device, and the control device, in a boot block writing in which is restricted, included in the auxiliary storage device.

* * * * *